Nov. 15, 1955     A. G. McNEILL     2,723,745
EYEGLASS CASE

Filed Oct. 5, 1953     2 Sheets-Sheet 1

INVENTOR.
ALBERT GEORGE McNEILL
BY
HIS ATTORNEY.

Nov. 15, 1955 A. G. McNEILL 2,723,745
EYEGLASS CASE
Filed Oct. 5, 1953 2 Sheets-Sheet 2

INVENTOR.
ALBERT GEORGE McNEILL
BY Joshua R. H. Potts
HIS ATTORNEY.

United States Patent Office 2,723,745
Patented Nov. 15, 1955

2,723,745

EYEGLASS CASE

Albert George McNeill, Maple Glen, Pa., assignor to Bachmann Bros. Inc., Philadelphia, Pa., a corporation of Pennsylvania Application October 5, 1953, Serial No. 383,952

4 Claims. (Cl. 206—5)

This invention relates to eyeglass cases, and particularly to a molded, plastic eyeglass case of novel and simple construction.

There are many types of eyeglass cases currently available on the market, taking a variety of shapes and being constructed in various ways from many different materials. For example, some of the better eyeglass cases are constructed from leather-covered metal and consist of an eyeglass holder and cover hingedly connected together. Others are made from semi-flexible leather having an integral eyeglass holder and cover, the cover connecting to the holder by means of a conventional snap fastener. A still cheaper variety is made from simulated leather, while still others are molded into shape from plastic using metal fittings for hinging and/or fastening means.

The present invention contemplates the provision of a light, simple and durable eyeglass case, molded in one flat piece and folded into shape without the use of any metal fittings whatsoever.

It is an object of this invention, therefore, to provide an improved eyeglass case.

It is another object of this invention to provide a uniquely molded eyeglass case.

A further object of this invention is to provide a molded plastic eyeglass case, being made completely of plastic, using no metal fittings whatsoever.

A still further object is to provide a durable, transparent, flexible eyeglass case, made from a single piece of molded plastic.

These objects, together with some of the advantages to be derived in utilizing the present invention, will become apparent from the following detailed description and from the accompanying drawings describing the preferred embodiment of this invention in which similar numerals refer to similar parts throughout the several views.

Figure 1:
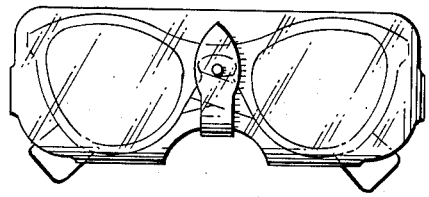
Figure 1 is a front elevational view of the eyeglass case of this invention in assembled relationship, and showing a pair of glasses therewithin.
Figure 2:
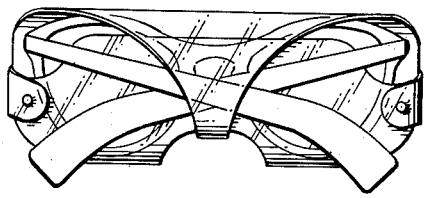
Figure 2 is a rear elevational view of the eyeglass case of Figure 1.
Figure 9:
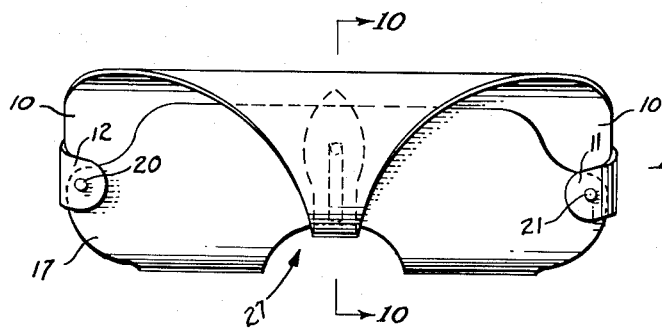
Figure 9 is a rear elevational view of the eyeglass case in final assembly illustrating the second stage of the folding operation.
Figure 10:
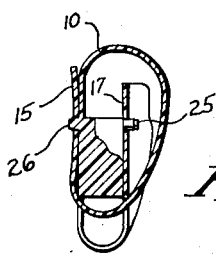
Figure 10 is a sectional view of the finally assembled case taken along the line 10—10 of Figure 9.

Referring to the drawings, and particularly Figures 1 and 2, there is shown therein the assembled eyeglass case of this invention with a pair of eyeglasses therewithin. This case is molded in one flat piece in the form depicted in Figure 3 and is folded into the configuration of Figures 1 and 2 by the folding steps illustrated in Figures 6 and 9. It will be noted that this case is made entirely from plastic and that no metal fittings, in the nature of snap fasteners or hinges, are required, as is so often used on the conventional eyeglass case.

This case is molded from a relatively soft, flexible plastic, having durable qualities, such as vinylite, polyethylene, or the like. Vinylite is preferred, since it results in a transparent eyeglass case which provides a unique case which can be used for display purposes in addition to performing the function of protecting the eyeglasses from possible disfiguration or breakage. This eyeglass case is molded to a preferred thickness of .040 in. to the configuration shown in Figure 3.

Figure 3:
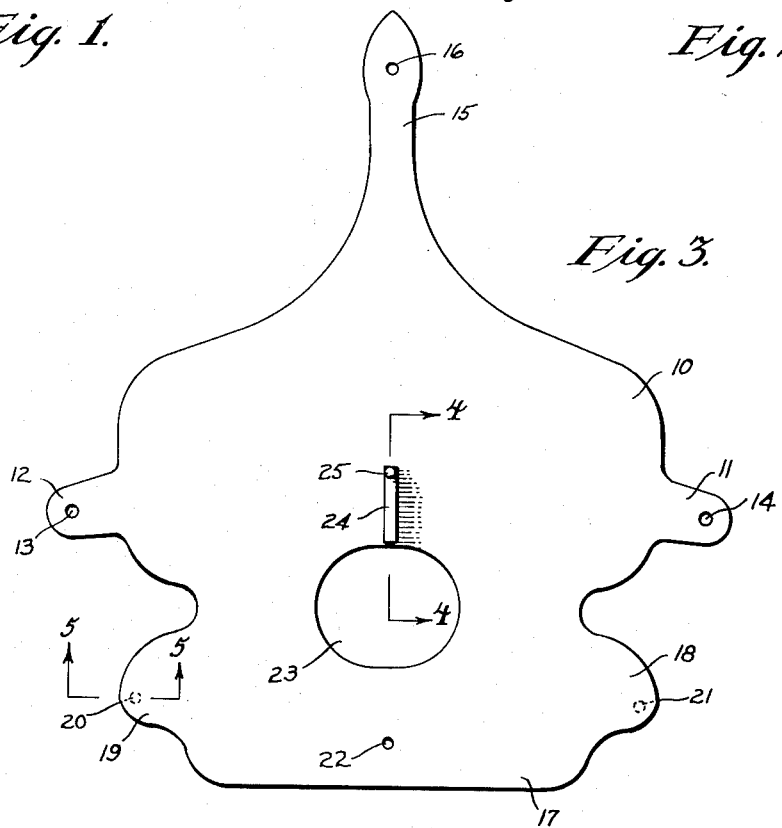
Figure 3 is a plan view of the eyeglass case unfolded, and representing the said case as it is taken from the mold.
Figure 4:
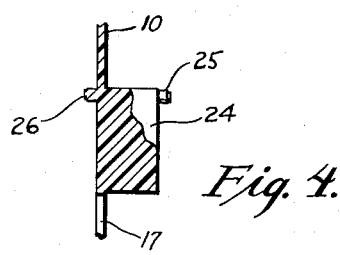
Figure 4 is a partial sectional view of the nose-bridge rib of the case, taken along the line 4—4 of Figure 3.
Figure 5:
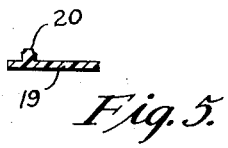
Figure 5 is a sectional view of the fastening lugs of this case, taken along the line 5—5 of Figure 3.

Referring to Figure 3, the case is there shown in flattened-out relationship as consisting of a front flap 10 of substantially rectangular configuration having side extensions 11 and 12 integral therewith. The said side extensions are provided with apertures 13 and 14 whose function will be described later. Extending outwardly of the top of said flap 10 is an elongated tongue 15 which is provided with an aperture 16 therein. Integrally connected with the front flap 10, on the bottom portion thereof, is a rear flap 17 having extensions 18 and 19 outstanding from both sides thereof. These extensions carry fastening lugs 20 and 21 outstanding perpendicularly from the bottom thereof for a purpose to be described below; this structure is shown more clearly in Figure 5. The rear flap 17 is provided with a small aperture 22, and a large elliptical opening 23 separates the two flaps 10 and 17. Upstanding from the surface of the front flap 10 in adjacent relationship with the elliptical opening 23 is a rectangularly shaped nose-bridge rib 24 which carries a fastening lug 25 near one end thereof. This rib 24 is shown in enlarged detail in Figure 4. Integrally joined to the bottom surface of the front flap 10, in axial alignment with the lug 25, is another fastening lug 26, as shown in Figure 4.

It is to be emphasized that all of the above-described elements are molded into a unitary piece as shown in Figure 3 with no fittings or adhesives used in the construction or assembly thereof.

Figure 7:
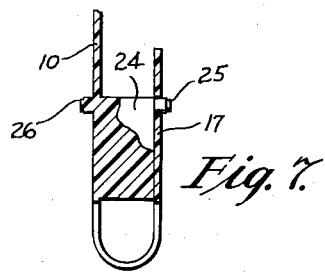
Figure 7 is a sectional view of the partially assembled case taken along the line 7—7 of Figure 6.
Figure 8:
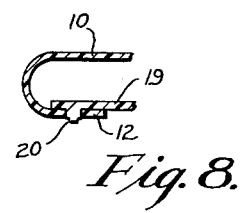
Figure 8 is a sectional view of the partially assembled case taken along the line 8—8 of Figure 6.
Figure 6:
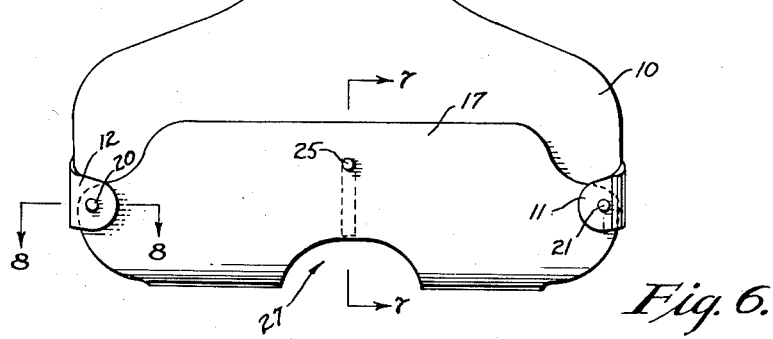
Figure 6 is a rear elevational view of the eyeglass case in partial assembly illustrating the first stage of the folding operation.

Referring now to Figures 6 to 11, in assembling this molded eyeglass case, the rear flap 17 is first folded back upon the nose-bridge rib 24, as shown in Figure 6, so that the lug 25 protrudes through the aperture 22 holding the said flap 17 in the thus folded position. The side extensions 11 and 12 are then folded forwardly over the top of the flap 17 so that the lugs 20 and 21 on the extensions 18 and 19 protrude through the apertures 13 and 14 in said side extensions, as shown in Figure 6. Thus folded, the elliptical opening 23 provides a cut-out section 27, as indicated in Figures 6 and 7. Next, the elongated tongue 15 is folded forwardly and downwardly into the cut-out 27 and then upwardly upon the back of the front flap 10 so that the fastening lug 26 protrudes through the aperture 16 provided in said tongue, thus fastening the tongue to the case. This completes the assembly.

Figure 11:
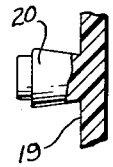
Figure 11 is an enlarged detail view of one of the fastening lugs illustrating the undercut thereof for improved retention.

Attention is called to the construction of the fastening lugs, as depicted in detail in Figure 11. As shown therein, these lugs are molded with an undercut or negative draft so that the diameter of the lug will be smaller at the base than at the top. This configuration insures a more positive retention of the attaching side extensions. The lugs may also be provided with a protruding disc of smaller diameter at the end thereof whose purpose it is to facilitate the initial insertion of the lug through the side extension and elongated tongue apertures.

Although the present discussion has been limited to the above-described preferred embodiment, other variations thereof are possible without departing from the spirit of the invention. It is therefore not intended that the invention be limited to the particular embodiment disclosed, but only to the inventive concept as defined by the appended claims.

What is claimed is:

1. In a one-piece eyeglass case, a sheet of flat flexible material having a back flap portion and a front flap portion, side extensions on said front flap portion having apertures therein, side extensions on said back flap portion having fastening lugs integral therewith, the said lugs cooperating with said apertures so as to hold the front flap portion in folded engagement with said back flap portion the said sheet being provided with an opening between said front and back flap portions, an integral rib member on said sheet in perpendicular relationship to the plane of said sheet in adjacent relationship to said opening, an elongated tongue integrally concentrated to said front flap portion, and means for holding said elongated tongue in folded engagement with said front and back flap portions.

2. In a one-piece eyeglass case, a flat sheet of molded plastic having a back flap portion and a front flap portion, side extensions on said front flap portion having apertures therein, side extensions on said back flap portion having fastening lugs integrally molded thereon, the said lugs cooperating with said apertures so as to hold the front flap portion in folded engagement with said back flap portion, the said sheet being provided with an opening between said front and back flap portions, a rib member integrally molded to said sheet in perpendicular relationship to the plane of said sheet in adjacent relationship with said opening, an integral fastening lug carried by said rib, the said back flap having an aperture in axial alignment with said rib lug and cooperating therewith to hold the back flap against said rib, an elongated tongue integrally connected to said front flap portion, and means for holding said elongated tongue in folded engagement with said front and back flap portions.

3. In a one-piece eyeglass case, a flat sheet of molded plastic having a back flap portion and a front flap portion, side extensions on said front flap portion having apertures therein, side extensions on said back flap portion having fastening lugs integrally molded thereon, the said lugs lugs having a negative draft and cooperating with said apertures so as to securely hold the front flap portion in folded engagement with said back flap portion, the said sheet being provided with an opening between said front and back flap portions, a rib member integrally molded to said sheet in perpendicular relationship to the plane of said sheet in adjacent relationship with said opening, a fastening lug integral with said rib and having a negative draft, the said back flap having an aperture in axial alignment with said rib lug and cooperating therewith to hold the back flap against said rib, an elongated tongue integrally connected to said front flap portion, and means for holding said elongated tongue in folded engagement with said front and back flap portions.

4. In a one-piece eyeglass case, a flat sheet of molded plastic having a back flap portion and a front flap portion, side extensions on said front flap portion having apertures therein, side extensions on said back flap portion having fastening lugs integrally molded thereon, the said lugs having a negative draft and cooperating with said apertures so as to securely hold the front flap portion in folded engagement with said back flap portion, the said sheet being provided with an opening between said front and back flap portions, a rib member integrally molded to said sheet in perpendicular relationship to the plane of said sheet in adjacent relationship with said opening, a fastening lug integral with said rib and having a negative draft, the said back flap having an aperture in axial alignment with said rib lug and cooperating therewith to hold the back flap against said rib, an integral lug extending outwardly from said front flap portion in axial alignment with said rib lug and having a negative draft, and an elongated tongue integrally connected to said front flap portion and having an aperture therein for receiving said outwardly extending lug so as to hold the tongue in folded engagement with said front and back flap portions.

References Cited in the file of this patent

UNITED STATES PATENTS

| Re. 90,916 | Lafferty | Oct. 24, 1933 |
| D. 170,343 | Stegeman | Sept. 1, 1953 |
| 952,181 | Bornot | Mar. 15, 1910 |
| 1,740,134 | Winston | Dec. 17, 1929 |
| 2,374,026 | McKeen | Apr. 17, 1945 |
| 2,442,091 | Mann et al. | May 25, 1948 |
| 2,473,292 | Nathan | June 14, 1949 |
| 2,478,269 | Huttemeyer | Aug. 9, 1949 |
| 2,617,462 | Grosvenor | Nov. 11, 1952 |

FOREIGN PATENTS

| 445,064 | Great Britain | Apr. 2, 1936 |
| 588,871 | Great Britain | June 5, 1947 |
| 621,404 | Great Britain | Apr. 8, 1949 |
| 625,357 | Great Britain | June 27, 1949 |